Patented May 30, 1939

2,160,058

UNITED STATES PATENT OFFICE 2,160,058

PROCESS FOR PREPARING HEXADECYL AMINES

Lloyd W. Covert, Philadelphia, Pa., assignor to Röhm & Haas Company, Philadelphia, Pa.

No Drawing. Application March 26, 1938, Serial No. 198,227

12 Claims. (Cl. 260—583)

This invention relates to amines containing an alkyl group derived from dicapryl alcohol.

Capryl alcohol, octanol-2, is obtained in considerable quantities as a by-product in the manufacture of sebacic acid and has heretofore been considered to be of little commercial value. Dicapryl alcohol is readily obtained from capryl alcohol by treating the latter with an alkali.

It has now been found that hexadecyl amines with exceptional characteristics may be prepared from dicapryl alcohol. These amines are useful as fungicides and insecticides; they have wetting and emulsifying properties in acid solution and may be converted into quaternary ammonium salts which are useful as textile assistants, wetting agents, emulsifying agents and the like. By reacting these amines with fatty acids or fatty acid esters, wax-like compositions are obtained.

These hexadecyl amines which container the dicapryl group,

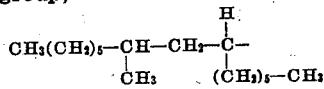

attached directly to the nitrogen atom may be prepared by methods heretofore used for preparing amines, e. g. the hydroxyl of the alcohol may be replaced by halogen and the amine prepared in the customary manner from the halide; the polybasic mineral acid esters of dicapryl alcohol such as sodium dicapryl sulfate may be reacted with ammonia, primary or secondary amines; or dicapryl alcohol may be reacted with an aminating agent in the presence of a dehydrating catalyst. These methods are not very satisfactory, however, because the yields are low, particularly those obtained by the last method mentioned.

Attempts to make the hexadecyl amine by heating dicapryl alcohol and an aminating agent in the presence of various types of catalysts have met with failure, as no substantial amount of hexadecyl amine is produced.

It has now been found that good yields of hexadecyl amine are obtained by heating either dicapryl alcohol or its corresponding ketone, namely 9-methyl-pentodecanone-7, and an aminating agent in the presence of hydrogen, and either a hydrogenating or hydrogenating-dehydrogenating catalyst. Best yields are obtained if the hydrogen is maintained at pressures above 200 lbs. per square inch. The aminating agent may be ammonia or primary or secondary amines. If ammonia is used, the principal product is monohexadecyl amine but a small amount of dihexadecyl and trihexadecyl amines is also produced. If a primary or secondary amine is used as the aminating agent, the corresponding amine containing one dicapryl radical in place of one hydrogen is obtained, but in the case of a primary amine, some of the corresponding dihexadecyl amine is also formed. Typical aminating agents are ammonia, monomethyl and dimethyl amines and their homologues, monoethanolamine and diethanolamine and their homologues, aniline, benzyl amine, dibenzyl amine, and the like, but any primary or secondary amine may be used. Such amines have the general formula

in which $R_1$ and $R_2$ represent hydrogen, lower alkyl, lower alkylol, phenyl or benzyl groups. Quaternary ammonium salts may be obtained from the hexadecyl amines by treating the latter with an aliphatic chloride, dialkyl sulfate or alkylene oxide. The corresponding base may be obtained by treating with an alkali.

Although identical processes may be used to prepare the hexadecyl amines from dicapryl alcohol or from 9-methyl-pentadecanone-7, milder conditions of reactions may be used when the ketone is substituted for the alcohol as the starting material.

When dicapryl alcohol is the starting material, the hexadecyl amine is prepared by heating the alcohol with an excess of ammonia or primary or secondary amine in the presence of hydrogen and a hydrogenating-dehydrogenating catalyst, such as one consisting essentially of copper, barium and chromium oxides; copper, chromium oxides; or copper, aluminum oxides. A temperature of 225° to 300° C. and a hydrogen pressure of at least 200 lbs. per square inch is preferred. The hexadecyl amine is separated from the reaction mixture, which also contains some dihexadecyl and trihexadecyl amines, by distillation.

The ketone corresponding to dicapryl alcohol, namely, 9-methyl-pentadecanone-7, may be made by either dehydrogenating dicapryl alcohol or by oxidizing dicapryl alcohol with an oxidizing agent. When this is used as the starting material, it is usually most convenient to allow the ammonia or amine to add to the ketone at approximately room temperature. The product is then hydrogenated at 100° to 150° C. in the presence of a catalyst such as nickel and with a hydrogen pressure of 200 lbs. or more. This method is particularly suited to the preparation of primary or secondary amines.

The following examples illustrate the preparation of the hexadecyl amines containing a dicapryl group but do not limit the invention in any way.

*Example 1*

A mixture of 250 parts by weight of dicapryl alcohol and 90 parts of dimethyl amine is heated for two hours at 260° C. in the presence of a copper-barium-chromium oxide catalyst and hydrogen at a pressure of 500 lbs. per square inch. The reaction product is distilled at 170°–180° C./5 mm. and the hexadecyl dimethyl amine obtained as a colorless liquid having a mild odor which is typical of the higher amines. The yield is 65% of the theoretical. A small amount of the di- and trihexadecyl dimethyl amines is also produced.

*Example 2*

100 parts by weight of 9-methyl-pentadecanone-7, 35 parts of methylamine and 5 parts of active nickel catalyst are placed in an agitated autoclave and agitated at room temperature for about one hour. During this time the amine condenses with the ketone. A hydrogen pressure of about 500 lbs. per square inch is then applied and the autoclave is heated to about 125° C. Water is split out and the compound is saturated. The reaction is completed in about two hours time. The product may be distilled and about a 70% yield of N-methyl-N-α-hexyl-γ-methyl-nonyl amine is obtained.

The dimethyl amine in Example 1 may be substituted by an equivalent weight of ammonia or any primary or secondary amine without other variations in the process. Amines containing the group

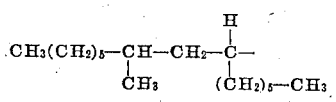

directly connected to the nitrogen atom are produced in all cases.

These hexadecyl amines have a lower melting point than the straight chain compounds with the same number of carbon atoms, but other properties are similar.

I claim:

1. An amine of the formula

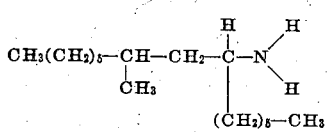

2. An amine of the formula

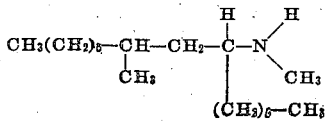

3. An amine of the formula

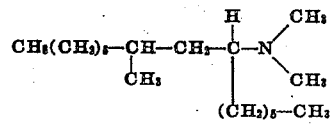

4. A process for the manufacture of amines of the general formula

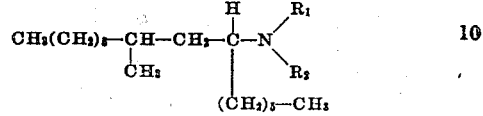

which comprises reacting together a member of the group consisting of dicapryl alcohol and 9-methyl-pentadecanone-7 and a member of the group consisting of ammonia and an amine of the general formula

in which $R_1$ and $R_2$ are selected from the group consisting of hydrogen, lower alkyl groups, lower alkylol groups, the phenyl and benzyl groups in the presence of hydrogen and a hydrogenating-dehydrogenating catalyst.

5. A process for the manufacture of amines of the general formula

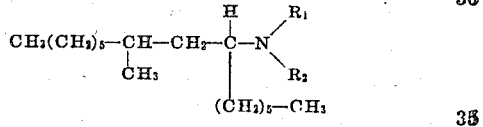

which comprises reacting together dicapryl alcohol and a member of the group consisting of ammonia and an amine of the general formula

in which $R_1$ and $R_2$ are selected from the group consisting of hydrogen, lower alkyl groups, lower alkylol groups, the phenyl and benzyl groups in the presence of hydrogen and a hydrogenating-dehydrogenating catalyst.

6. A process for the manufacture of amines of the general formula

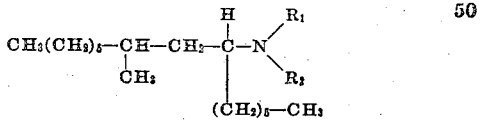

which comprises reacting together 9-methyl-pentadecanone-7 and a member of the group consisting of ammonia and an amine of the general formula

in which $R_1$ and $R_2$ are selected from the group consisting of hydrogen, lower alkyl groups, lower alkylol groups, the phenyl and benzyl groups and then hydrogenating the product in the presence of a hydrogenating catalyst.

7. A process for the manufacture of aliphatic amines of the general formula

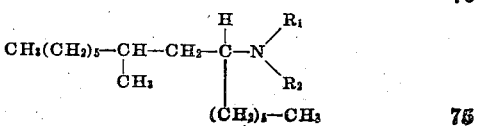

which comprises reacting together dicapryl alcohol and a member of the group consisting of ammonia and an amine of the general formula

in which $R_1$ and $R_2$ are selected from the group consisting of hydrogen, lower alkyl groups, lower alkylol groups, the phenyl and benzyl groups in the presence of hydrogen and a hydrogenating-dehydrogenating catalyst.

8. A process for the manufacture of aliphatic amines of the general formula

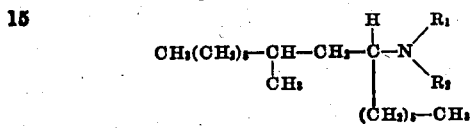

which comprises reacting together 9-methyl-pentadecanone-7 and a member of the group consisting of ammonia and an amine of the general formula

in which $R_1$ and $R_2$ are selected from the group consisting of hydrogen, lower alkyl groups, lower alkylol groups, the phenyl and benzyl groups and then hydrogenating the product in the presence of a hydrogenating catalyst.

9. A process for preparing a hexadecyl dimethyl amine of the formula

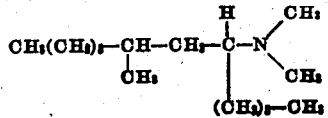

which comprises reacting together dicapryl alcohol and dimethyl amine in the presence of hydrogen and a hydrogenating-dehydrogenating catalyst.

10. A process for preparing a hexadecyl dimethyl amine of the formula

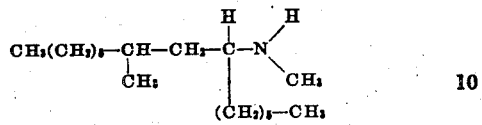

which comprises reacting together dicapryl alcohol and methyl amine in the presence of hydrogen and a hydrogenating-dehydrogenating catalyst.

11. A process for preparing an amine of the formula

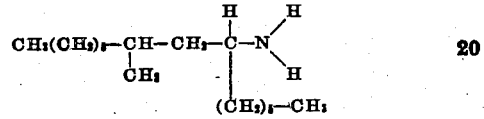

which comprises reacting together ammonia and 9-methyl-pentadecanone-7 and then hydrogenating the product in the presence of a hydrogenating catalyst.

12. Amines of the general formula

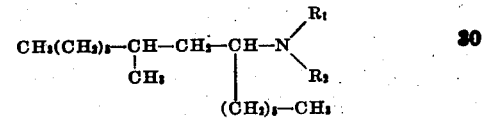

in which $R_1$ and $R_2$ are selected from the group consisting of hydrogen, lower alkyl groups, lower alkylol groups, the phenyl and benzyl groups.

LLOYD W. COVERT.